US011438105B2

(12) United States Patent
Yang et al.

(10) Patent No.: US 11,438,105 B2
(45) Date of Patent: Sep. 6, 2022

(54) INFORMATION TRANSMISSION ON A CONTROL CHANNEL

(71) Applicant: HUAWEI TECHNOLOGIES CO., LTD., Guangdong (CN)

(72) Inventors: Fan Yang, Beijing (CN); Xingwei Zhang, Lund (SE); Zhe Liu, Beijing (CN); Jie Shi, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 104 days.

(21) Appl. No.: 16/925,506

(22) Filed: Jul. 10, 2020

(65) Prior Publication Data

US 2020/0344008 A1    Oct. 29, 2020

Related U.S. Application Data

(63) Continuation of application No. PCT/CN2019/071059, filed on Jan. 10, 2019.

(30) Foreign Application Priority Data

Jan. 11, 2018  (CN) .......................... 201810027936.1

(51) Int. Cl.
*H04L 1/18* (2006.01)
*H04W 72/04* (2009.01)
*H04W 72/12* (2009.01)

(52) U.S. Cl.
CPC ......... *H04L 1/1819* (2013.01); *H04W 72/042* (2013.01); *H04W 72/0446* (2013.01); *H04W 72/0453* (2013.01); *H04W 72/1273* (2013.01)

(58) Field of Classification Search
CPC ... H04L 1/1819; H04L 5/0053; H04L 1/1861; H04L 1/0035; H04W 72/042;
(Continued)

(56) References Cited

U.S. PATENT DOCUMENTS

2012/0076037 A1* 3/2012 Noh ...................... H04L 5/0007
                                                      370/252
2012/0134305 A1* 5/2012 Damnjanovic ....... H04L 1/1854
                                                      370/280
(Continued)

FOREIGN PATENT DOCUMENTS

CN         104685955 A      6/2015
CN         107306171 A     10/2017
WO       2010104957 A2      9/2010

OTHER PUBLICATIONS

Samsung, "Update on Summary of Collision Handling Aspects for LC/CE UEs", 3GPP TSG RAN WG1 #84, R1-161377, St Julians, Malta, Feb. 15-19, 2016, 13 pages.

(Continued)

*Primary Examiner* — Jael M Ulysse (74) *Attorney, Agent, or Firm* — Fish & Richardson P.C.

(57) ABSTRACT

Example information transmission methods and apparatus are described. One example method includes receiving higher layer signaling and downlink control information. A time-frequency resource corresponding to scheduling request (SR) information and a time-frequency resource corresponding to hybrid automatic repeat request (HARQ) information are respectively determined based on the higher layer signaling and the downlink control information; The SR information is sent by using a first time-frequency resource, and the HARQ information is sent by using a second time-frequency resource. The first time-frequency resource is a part of the time-frequency resource corresponding to the SR information and does not overlap the second time-frequency resource in time domain, and the second time-frequency resource is the time-frequency resource corresponding to the HARQ information. Alternatively, the HARQ information is sent by using the time-frequency (Continued)

resource corresponding to the HARQ information, where the SR information is not sent.

9 Claims, 5 Drawing Sheets

(58) Field of Classification Search
CPC ......... H04W 72/0446; H04W 72/0453; H04W 72/1273; H04W 72/04
See application file for complete search history.

(56) References Cited

U.S. PATENT DOCUMENTS

| | | | |
|---|---|---|---|
| 2014/0192755 A1* | 7/2014 | Kim | H04L 5/0037 370/329 |
| 2015/0023285 A1 | 1/2015 | Gauvreau et al. | |
| 2015/0208262 A1* | 7/2015 | Siomina | H04W 24/10 370/252 |
| 2016/0029365 A1* | 1/2016 | Papasakellariou | H04L 1/1812 370/329 |
| 2017/0164350 A1* | 6/2017 | Sun | H04W 72/042 |
| 2017/0366380 A1* | 12/2017 | Hwang | H04W 72/0413 |
| 2018/0006790 A1* | 1/2018 | Park | H04L 1/1887 |
| 2018/0124817 A1* | 5/2018 | Zhang | H04L 1/1861 |
| 2018/0132264 A1* | 5/2018 | Jung | H04L 1/1861 |
| 2018/0227958 A1* | 8/2018 | Xiong | H04W 88/023 |
| 2018/0302895 A1* | 10/2018 | Akkarakaran | H04W 72/1268 |
| 2018/0310257 A1* | 10/2018 | Papasakellariou | H04W 52/08 |
| 2018/0368173 A1* | 12/2018 | Shaheen | H04W 72/14 |
| 2019/0110282 A1* | 4/2019 | Papasakellariou | H04W 72/0406 |
| 2019/0150124 A1* | 5/2019 | Nogami | H04L 5/0094 370/330 |
| 2019/0159135 A1* | 5/2019 | MolavianJazi | H04W 52/362 |
| 2019/0159191 A1* | 5/2019 | Kim | H04L 5/00 |
| 2019/0229964 A1* | 7/2019 | Ouchi | H04W 92/18 |
| 2020/0015248 A1* | 1/2020 | Ji | H04W 72/042 |
| 2020/0344789 A1* | 10/2020 | Gao | H04L 1/1854 |
| 2021/0111837 A1* | 4/2021 | Li | H04L 1/1812 |

OTHER PUBLICATIONS

Intel Corporation, "Remaining aspects of PUCCH for MTC", 3GPP TSG RAN WG1 Meeting #83, R1-156502, Anaheim, USA, Nov. 16-20, 2015, 5 pages.

Panasonic, "Discussion on SR for URLLC and multiplexing with HARQ-ACK", 3GPP TSG RAN WG1 NR Ad-Hoc#2, R1-1710942, Qingdao, P.R. China, Jun. 27-30, 2017, 2 pages.

Ericsson, "On the Design of 1-Symbol PUCCH for up to 2 bits", 3GPP TSG RAN WG1 Meeting#91, R1-1720999, Reno, USA, Nov. 27- Dec. 1, 2017, 6 pages.

3GPP TS 38.213 V15.0 0 (Dec. 2017), 3rd Generation Partnership Project,Technical Specification Group Radio Access Network,NR,Physical layer procedures for control(Release 15), 56 pages.

3GPP TS 38.331 V15.0 0 (Dec. 2017),3rd Generation Partnership Project,Technical Specification Group Radio Access Network, NR, Radio Resource Control (RRC) protocol specification(Release 15),188 pages.

PCT International Search Report and Written Opinion in International Application No. PCT/CN2019/071,059, dated Mar. 28, 2019, 15 pages (With English Translation).

Office Action issued in Chinese Application No. 201810027936.1 dated Apr. 27, 2020, 23 pages (With English Translation).

CATT, "UL collision handling for eMTC," 3GPP TSG RAN WG1 Meeting #84, R1-160352, St Julian's, Malta, Feb. 15-19, 2016, 3 pages.

Extended European Search Report issued in European Application No. 19738241.9 dated Jan. 20, 2021, 8 pages.

Office Action issued in Indian Application No. 202047029728 dated Nov. 12, 2021, 7 pages.

* cited by examiner

INFORMATION TRANSMISSION ON A CONTROL CHANNEL

CROSS-REFERENCE TO RELATED APPLICATIONS

This application is a continuation of International Application No. PCT/CN2019/071059, filed on Jan. 10, 2019, which claims priority to Chinese Patent Application No. 201810027936.1, filed on Jan. 11, 2018. The disclosures of the aforementioned applications are hereby incorporated by reference in their entireties.

TECHNICAL FIELD

This application relates to the communications field, and more specifically, to an information transmission method and apparatus, and a computer-readable storage medium.

BACKGROUND

In a communications network, an uplink control channel may simultaneously send scheduling request (scheduling request, SR) information and hybrid automatic repeat request (hybrid automatic repeat request, HARQ) information on a time domain resource.

Generally, a terminal device expects that in a slot (slot), an orthogonal frequency division multiplexing (orthogonal frequency division multiplexing, OFDM) symbol corresponding to a time-frequency resource that can carry SR information is different from an orthogonal frequency division multiplexing (orthogonal frequency division multiplexing, OFDM) symbol corresponding to a time-frequency resource that can carry HARQ information. The time-frequency resource for the SR information and the time-frequency resource for the HARQ information may completely overlap (to be specific, the SR information and the HARQ information have a same start symbol and time length) in time domain, or may partially overlap (to be specific, the SR information and the HARQ information have different start symbols or time lengths) in time domain.

When the time-frequency resource corresponding to the SR information and the time-frequency resource corresponding to the HARQ information completely overlap in time domain, in the prior art, the SR information and the HARQ information are simultaneously sent on the time-frequency resource corresponding to the SR information or the time-frequency resource corresponding to the HARQ information. When the time-frequency resource corresponding to the SR information and the time-frequency resource corresponding to the HARQ information partially overlap in time domain, if the SR information and the HARQ information are simultaneously sent on the time-frequency resource corresponding to the SR information, a processing latency and a transmission latency of UE cannot be met in a transmission process of the HARQ information. If the SR information and the HARQ information are simultaneously sent on the time-frequency resource corresponding to the HARQ information, in some cases, SR information receiving is delayed, and a time for obtaining an uplink resource by the user equipment is prolonged.

SUMMARY

This application provides an information transmission method and apparatus, and a computer-readable storage medium, to ensure a transmission latency of HARQ information or with additional consideration of an SR sending time.

According to a first aspect, an information transmission method is provided, and includes: receiving downlink control information or higher layer signaling; respectively determining, based on the downlink control information and the higher layer signaling, a time-frequency resource corresponding to scheduling request SR information and a time-frequency resource corresponding to hybrid automatic repeat request HARQ information, where the time-frequency resource corresponding to the SR information and the time-frequency resource corresponding to the HARQ information partially overlap in time domain; and sending the SR information and the HARQ information by using the time-frequency resource corresponding to the HARQ information; or sending the SR information by using a first time-frequency resource, and sending the HARQ information by using a second time-frequency resource, where the first time-frequency resource is a part of the time-frequency resource corresponding to the SR information and does not overlap the second time-frequency resource in time domain, and the second time-frequency resource is the time-frequency resource corresponding to the HARQ information; or the first time-frequency resource is the time-frequency resource corresponding to the SR information, and the second time-frequency resource is a part of the time-frequency resource corresponding to the HARQ information and does not overlap the first time-frequency resource in time domain; or sending the HARQ information by using the time-frequency resource corresponding to the HARQ information, where the SR information is not sent.

In the foregoing technical solution, when the time-frequency resource carrying the HARQ information and the time-frequency resource carrying the SR information partially overlap in time domain, a latency requirement of the HARQ information (for example, a processing time of a terminal device or a transmission latency of the HARQ information) can be ensured, or a transmission time of the SR information can be ensured.

In a possible implementation, the sending the SR information by using a first time-frequency resource, and sending the HARQ information by using a second time-frequency resource includes: when the time-frequency resource corresponding to the SR information is earlier than, in time domain, the time-frequency resource corresponding to the HARQ information, sending the SR information by using the first time-frequency resource, and sending the HARQ information by using the second time-frequency resource.

In the foregoing technical solution, if the time-frequency resource carrying the SR information is sent earlier than, in time domain, the time-frequency resource carrying the HARQ information, the SR information may be sent by using a part (which does not overlap the HARQ resource in time domain) of the time-frequency resource corresponding to the SR information, or the HARQ information may be sent by using a part (which does not overlap the SR resource in time domain) of the time-frequency resource corresponding to the HARQ information. In this way, a transmission time of the SR information can be ensured, or a processing latency of processing or generating the HARQ information by the terminal device or a transmission latency of the HARQ information can be ensured.

In a possible implementation, the sending the SR information by using a first time-frequency resource, and sending the HARQ information by using a second time-frequency resource includes: when the time-frequency resource corresponding to the SR information is later than, in time domain, the time-frequency resource corresponding to the HARQ information, sending the SR information by using the first time-frequency resource, and sending the HARQ information by using the second time-frequency resource.

In the foregoing technical solution, if the time-frequency resource carrying the SR information is sent later than, in time domain, the time-frequency resource carrying the HARQ information, the SR information may be sent by using a part (which does not overlap the HARQ resource in time domain) of the time-frequency resource corresponding to the SR information, or the HARQ information may be sent by using a part (which does not overlap the SR resource in time domain) of the time-frequency resource corresponding to the HARQ information. In this way, a transmission time of the SR information can be ensured, or a processing latency of processing or generating the HARQ information by the terminal device or a transmission latency of the HARQ information can be ensured.

In a possible implementation, the sending the SR information and the HARQ information by using the time-frequency resource corresponding to the HARQ information includes: when the time-frequency resource corresponding to the SR information is later than, in time domain, the time-frequency resource corresponding to the HARQ information, sending the SR information and the HARQ information by using the time-frequency resource corresponding to the HARQ information.

In the foregoing technical solution, if the time-frequency resource carrying the SR information is sent later than, in time domain, the time-frequency resource carrying the HARQ information, the HARQ information and the SR information may be sent by using the time-frequency resource corresponding to the HARQ information, to ensure a transmission latency of the HARQ information.

In a possible implementation, the sending the SR information and the HARQ information by using the time-frequency resource corresponding to the HARQ information includes: when the time-frequency resource corresponding to the SR information completely includes or is completely included in the time-frequency resource corresponding to the HARQ information in time domain, sending the SR information and the HARQ information by using the time-frequency resource corresponding to the HARQ information.

In a possible implementation, the sending the HARQ information by using the time-frequency resource corresponding to the HARQ information, where the SR information is not sent includes: when the time-frequency resource corresponding to the SR information is earlier or later than, in time domain, the time-frequency resource corresponding to the HARQ information, sending the HARQ information by using the time-frequency resource corresponding to the HARQ information, where the SR information is not sent.

In the foregoing technical solution, when the time-frequency resource carrying the HARQ information and the time-frequency resource carrying the SR information partially overlap in time domain (where the time-frequency resource corresponding to the SR information is earlier or later than, in time domain, the time-frequency resource corresponding to the HARQ information), if the SR information is not sent, behavior of the user equipment UE can be simplified and processing complexity can be reduced.

In a possible implementation, the sending the HARQ information by using the time-frequency resource corresponding to the HARQ information, where the SR information is not sent includes: when the time-frequency resource corresponding to the SR information completely includes or is completely included in the time-frequency resource corresponding to the HARQ information in time domain, sending the HARQ information by using the time-frequency resource corresponding to the HARQ information, where the SR information is not sent.

In the foregoing technical solution, when the time-frequency resource carrying the HARQ information and the time-frequency resource carrying the SR information partially overlap in time domain (where the time-frequency resource for the HARQ information includes or is included in the time-frequency resource for the SR information), if the SR information is not sent, behavior of the user equipment UE can be simplified and processing complexity can be reduced.

In a possible implementation, the sending the SR information by using a first time-frequency resource, and sending the HARQ information by using a second time-frequency resource includes: when the time-frequency resource corresponding to the SR information uses an uplink control channel format 0, sending the SR information by using the first time-frequency resource, and sending the HARQ information by using the second time-frequency resource, where the first time-frequency resource is a part of the time-frequency resource corresponding to the SR information and does not overlap the second time-frequency resource in time domain, and the second time-frequency resource is the time-frequency resource corresponding to the HARQ information; or when the time-frequency resource corresponding to the HARQ information is sent by using an uplink control channel short format, sending the SR information by using the first time-frequency resource, and sending the HARQ information by using the second time-frequency resource, where the first time-frequency resource is the time-frequency resource corresponding to the SR information, and the second time-frequency resource is a part of the time-frequency resource corresponding to the HARQ information and does not overlap the first time-frequency resource in time domain.

In the foregoing technical solution, the SR information or the HARQ information may be sent by using a part of the time-frequency resource that uses the uplink control channel format 0, to ensure that no information is lost.

In a possible implementation, that the time-frequency resource corresponding to the SR information and the time-frequency resource corresponding to the HARQ information partially overlap in time domain includes: the time-frequency resource corresponding to the SR information and the time-frequency resource corresponding to the HARQ information are located in a same slot in time domain.

According to a second aspect, an information transmission method is provided. The method includes:

sending downlink control information or higher layer signaling; configuring a time-frequency resource corresponding to scheduling request SR information and a time-frequency resource corresponding to hybrid automatic repeat request HARQ information, where the time-frequency resource corresponding to the SR information and the time-frequency resource corresponding to the HARQ information partially overlap in time domain; and receiving the SR information and the HARQ information by using the time-frequency resource corresponding to the HARQ information; or receiving the SR information by using a first time-frequency resource, and receiving the HARQ information by using a second time-frequency resource, where the first time-frequency resource is a part of the time-frequency resource corresponding to the SR information and does not overlap the second time-frequency resource in time domain, and the second time-frequency resource is the time-frequency resource corresponding to the HARQ information; or the first time-frequency resource is the time-frequency resource corresponding to the SR information, and the second time-frequency resource is a part of the time-frequency resource corresponding to the HARQ information and does not overlap the first time-frequency resource in time domain; or receiving the HARQ information by using the time-frequency resource corresponding to the HARQ information, where the SR information is not received.

In the foregoing technical solution, when the time-frequency resource carrying the HARQ information and the time-frequency resource carrying the SR information partially overlap in time domain, a latency requirement of the HARQ information (for example, a processing time of a terminal device or a transmission latency of the HARQ information) can be ensured, or a transmission time of the SR information can be ensured.

In a possible implementation, the receiving the SR information by using a first time-frequency resource, and receiving the HARQ information by using a second time-frequency resource includes: when the time-frequency resource corresponding to the SR information is earlier than, in time domain, the time-frequency resource corresponding to the HARQ information, receiving the SR information by using the first time-frequency resource, and receiving the HARQ information by using the second time-frequency resource.

In the foregoing technical solution, if the time-frequency resource carrying the SR information is earlier than, in time domain, the time-frequency resource carrying the HARQ information, the SR information may be received by using a part (which does not overlap the HARQ resource in time domain) of the time-frequency resource corresponding to the SR information, or the HARQ information may be received by using a part (which does not overlap the SR resource in time domain) of the time-frequency resource corresponding to the HARQ information. In this way, a transmission time of the SR information or a transmission latency of the HARQ information can be ensured.

In a possible implementation, the receiving the SR information by using a first time-frequency resource, and receiving the HARQ information by using a second time-frequency resource includes: when the time-frequency resource corresponding to the SR information is later than, in time domain, the time-frequency resource corresponding to the HARQ information, receiving the SR information by using the first time-frequency resource, and receiving the HARQ information by using the second time-frequency resource.

In the foregoing technical solution, if the time-frequency resource carrying the SR information is later than, in time domain, the time-frequency resource carrying the HARQ information, the SR information may be received by using a part (which does not overlap the HARQ resource in time domain) of the time-frequency resource corresponding to the SR information, or the HARQ information may be received by using a part (which does not overlap the SR resource in time domain) of the time-frequency resource corresponding to the HARQ information. In this way, a transmission time of the SR information can be ensured, or a processing latency of processing or generating the HARQ information by the terminal device and a transmission latency of the HARQ information can be ensured.

In a possible implementation, the receiving the SR information and the HARQ information by using the time-frequency resource corresponding to the HARQ information includes: when the time-frequency resource corresponding to the SR information is later than, in time domain, the time-frequency resource corresponding to the HARQ information, receiving the SR information and the HARQ information by using the time-frequency resource corresponding to the HARQ information.

In the foregoing technical solution, if the time-frequency resource carrying the SR information is later than, in time domain, the time-frequency resource carrying the HARQ information, the HARQ information and the SR information may be received by using the time-frequency resource corresponding to the HARQ information, to ensure a transmission latency of the HARQ information.

In a possible implementation, the receiving the SR information and the HARQ information by using the time-frequency resource corresponding to the HARQ information includes: when the time-frequency resource corresponding to the SR information completely includes or is completely included in the time-frequency resource corresponding to the HARQ information in time domain, receiving the SR information and the HARQ information by using the time-frequency resource corresponding to the HARQ information.

In a possible implementation, the receiving the HARQ information by using the time-frequency resource corresponding to the HARQ information, where the SR information is not received includes: when the time-frequency resource corresponding to the SR information is earlier or later than, in time domain, the time-frequency resource corresponding to the HARQ information, receiving the HARQ information by using the time-frequency resource corresponding to the HARQ information, where the SR information is not received.

In the foregoing technical solution, when the time-frequency resource carrying the HARQ information and the time-frequency resource carrying the SR information partially overlap in time domain (where the time-frequency resource corresponding to the SR information is earlier or later than, in time domain, the time-frequency resource corresponding to the HARQ information), if the SR information is not received, behavior of the user equipment UE can be simplified and processing complexity can be reduced.

In a possible implementation, the receiving the HARQ information by using the time-frequency resource corresponding to the HARQ information, where the SR information is not received includes: when the time-frequency resource corresponding to the SR information completely includes or is completely included in the time-frequency resource corresponding to the HARQ information in time domain, receiving the HARQ information by using the time-frequency resource corresponding to the HARQ information, where the SR information is not received.

In the foregoing technical solution, when the time-frequency resource carrying the HARQ information and the time-frequency resource carrying the SR information partially overlap in time domain (where the time-frequency resource for the HARQ information includes or is included in the time-frequency resource for the SR information), if the SR information is not received, behavior of the user equipment UE can be simplified and processing complexity can be reduced.

In a possible implementation, the receiving the SR information by using a first time-frequency resource, and receiving the HARQ information by using a second time-frequency resource includes: when the time-frequency resource corresponding to the SR information uses an uplink control channel format 0, receiving the SR information by using the first time-frequency resource, and receiving the HARQ information by using the second time-frequency resource, where the first time-frequency resource is a part of the time-frequency resource corresponding to the SR information and does not overlap the second time-frequency resource in time domain, and the second time-frequency resource is the time-frequency resource corresponding to the HARQ information; or when the time-frequency resource corresponding to the HARQ information uses an uplink control channel format 0, receiving the SR information by using the first time-frequency resource, and receiving the HARQ information by using the second time-frequency resource, where the first time-frequency resource is the time-frequency resource corresponding to the SR information, and the second time-frequency resource is a part of the time-frequency resource corresponding to the HARQ information and does not overlap the first time-frequency resource in time domain.

In the foregoing technical solution, the SR information or the HARQ information may be sent by using a part of the time-frequency resource that uses the uplink control channel format 0, to ensure that no information is lost.

In a possible implementation, that the time-frequency resource corresponding to the SR information and the time-frequency resource corresponding to the HARQ information partially overlap in time domain includes: the time-frequency resource corresponding to the SR information and the time-frequency resource corresponding to the HARQ information are located in a same slot in time domain.

According to a third aspect, an information transmission apparatus is provided. The apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the method according to any one of the first aspect or the implementations of the first aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs the method according to any one of the first aspect or the implementations of the first aspect. The storage unit may be a storage unit (for example, a register or a cache) inside the chip, or may be a storage unit (for example, a read-only memory or a random access memory) that is located outside the chip and that is inside the terminal device.

According to a fourth aspect, an information transmission apparatus is provided. The apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, so that the network device performs the method according to any one of the second aspect or the implementations of the second aspect. When the apparatus is a chip in a network device, the processing unit may be a processor, and the transceiver unit may be an input/output interface, a pin, a circuit, or the like. The processing unit executes an instruction stored in a storage unit, so that the network device performs the method according to any one of the second aspect or the implementations of the second aspect. The storage unit may be a storage unit (for example, a register or a cache) inside the chip, or may be a storage unit (for example, a read-only memory or a random access memory) that is located outside the chip and that is inside the network device.

According to a fifth aspect, a computer program product is provided. The computer program product includes computer program code. When the computer program code is run on a terminal device, the terminal device is enabled to perform the method according to any one of the first aspect or the implementations of the first aspect.

According to a sixth aspect, a computer program product is provided. The computer program product includes computer program code. When the computer program code is run on a network device, the network device is enabled to perform the method according to any one of the second aspect or the implementations of the second aspect.

According to a seventh aspect, a computer-readable storage medium is provided. The computer-readable storage medium includes a computer instruction, where when the computer instruction is run on a terminal device, the terminal device is enabled to perform the method according to any one of the first aspect or the implementations of the first aspect.

According to an eighth aspect, a computer-readable storage medium is provided. The computer-readable storage medium includes a computer instruction, where when the computer instruction is run on a network device, the terminal device is enabled to perform the method according to any one of the second aspect or the implementations of the second aspect.

DESCRIPTION OF EMBODIMENTS

The following describes technical solutions of this application with reference to accompanying drawings.

Embodiments of this application may be applied to various communications systems, such as new radio (new radio, NR) and a future communications system. NR sometimes may also be referred to as the 5th generation (the 5th generation, 5G) mobile communications system.

A type of a terminal device is not specifically limited in the embodiments of this application. For example, the terminal device may be user equipment, an access terminal, a terminal, a subscriber unit, a subscriber station, a mobile station, a mobile console, a remote station, a remote terminal, a mobile device, a user terminal, a wireless network device, a user agent, or a user apparatus. The terminal may be but is not limited to a mobile station (mobile station, MS), a mobile phone (mobile telephone), user equipment (user equipment, UE), a handset (handset), portable equipment (portable equipment), a cellular phone, a cordless phone, and a session initiation protocol (session initiation protocol, SIP) phone, a wireless local loop (wireless local loop, WLL) station, a personal digital assistant (personal digital assistant, PDA), and a radio frequency identification (radio frequency identification, RFID) terminal device used for logistics, a handheld device with a wireless communication function, or a computing device, another device connected to a wireless modem, a vehicle-mounted device, a wearable device, a terminal device in an internet of things or an internet of vehicles, a terminal device in a future 5G network, a terminal device in a future evolved public land mobile network (public land mobile network, PLMN), or the like.

By way of example rather than limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

A type of a network device is not specifically limited in the embodiments of this application. The network device may be any device configured to communicate with the terminal device. For example, the network device may be a base transceiver station (base transceiver station, BTS) in global system for mobile communications (global system of mobile communication, GSM) or code division multiple access (code division multiple access, CDMA), a NodeB (NodeB, NB) in a wideband code division multiple access (wideband code division multiple access, WCDMA) system, an evolved NodeB (evolutional Node B, eNB or eNodeB) in a long term evolution (long term evolution, LTE) system, or a radio controller in a cloud radio access network (cloud radio access network, CRAN) scenario. Alternatively, the network device may be, for example, a relay station, an access point, a vehicle-mounted device, a wearable device, a network device in a future 5G network, or a network device in a future evolved PLMN network.

In a possible implementation, the network device may include a centralized unit (centralized unit, CU) and a distributed unit (distributed unit, DU). One CU may be connected to one DU, or a plurality of DUs may share one CU, to reduce costs and facilitate network expansion. The CU and the DU may be split based on a protocol stack. In a possible implementation, a radio resource control (radio resource control, RRC) layer, a service data adaptation protocol (service data adaptation protocol, SDAP) layer, and a packet data convergence protocol (packet data convergence protocol, PDCP) layer are deployed on the CU, and a remaining radio link control (radio link control, RLC) layer, media access control (media access control, MAC) layer, and physical layer are deployed on the DU.

The following describes in detail an information transmission method provided in the embodiments of this application.

Figure 1:
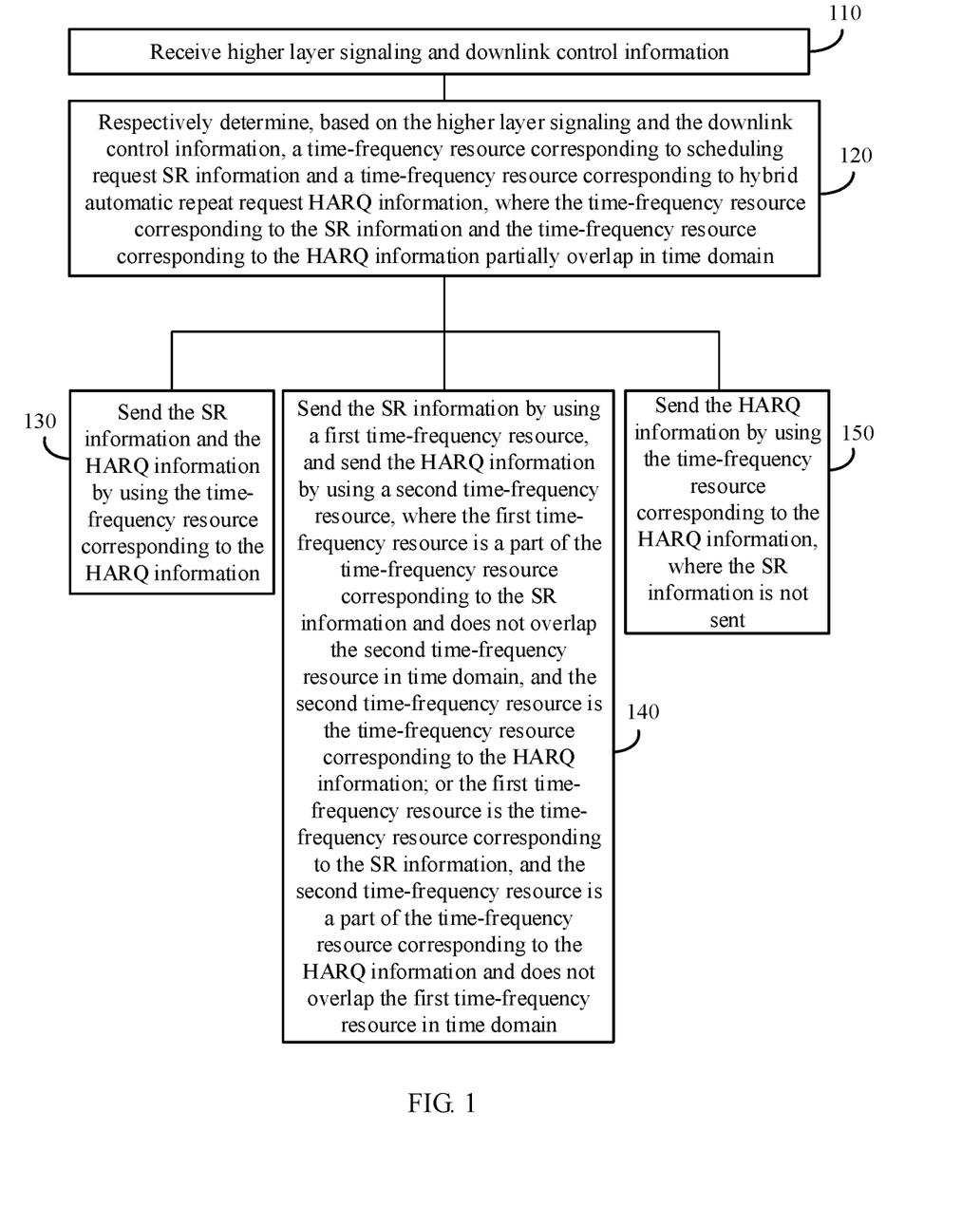
FIG. 1 is a schematic flowchart of an information transmission method according to an embodiment of this application.

FIG. 1 is a schematic flowchart of an information transmission method according to an embodiment of this application; The method in FIG. 1 may include steps 110 to 150. The following separately describes steps 110 to 150 in detail.

In step 110, downlink control information or higher layer signaling is received.

A terminal device (for example, UE) may receive downlink control information or higher layer signaling sent by a network device. The downlink control information may include, for example, physical uplink control channel (physical uplink control channel, PUCCH) resource indicator (PUCCH resource indicator) signaling. The higher layer signaling may include, for example, radio resource control (radio resource control, RRC) signaling.

In step 120, a time-frequency resource corresponding to scheduling request SR information and a time-frequency resource corresponding to hybrid automatic repeat request HARQ information are respectively determined based on the downlink control information and the higher layer signaling, where the time-frequency resource corresponding to the SR information and the time-frequency resource corresponding to the HARQ information partially overlap in time domain.

The terminal device (for example, the UE) may determine, based on the higher layer signaling, the time-frequency resource corresponding to the scheduling request SR information, for example, may determine, based on the RRC signaling, the time-frequency resource corresponding to the SR information. The terminal device (for example, the UE) may further determine, based on the downlink control information, the time-frequency resource corresponding to the HARQ information, for example, may determine, based on the PUCCH resource indicator (PUCCH resource indicator) signaling in the received downlink control information, the time-frequency resource corresponding to the HARQ information.

The terminal device (for example, the UE) may receive PUCCH configuration information sent by the network device. The PUCCH configuration information may be used to configure a plurality of PUCCH resource sets for the UE. The plurality of PUCCH resource sets may include at least one PUCCH resource set, and the PUCCH resource set may include at least the time-frequency resource carrying the SR information or the time-frequency resource carrying the HARQ information. In the PUCCH resource set, at least one PUCCH resource can ensure that the time-frequency resource for the SR information does not overlap the time-frequency resource for the HARQ information in time domain.

A manner in which the time-frequency resource carrying the SR information and the time-frequency resource carrying the HARQ information partially overlap in time domain is not specifically limited in this embodiment of this application. In an example, the time-frequency resources corresponding to the two types of information may partially overlap (partial overlap) in time domain in any form. For example, an orthogonal frequency division multiplexing (orthogonal frequency division multiplexing, OFDM symbol that is corresponding, in time domain, to the time-frequency resource carrying the SR information may be completely included in an OFDM symbol that is in time domain and that is of the time-frequency resource corresponding to the HARQ information. Alternatively, an OFDM symbol that is corresponding, in time domain, to the time-frequency resource carrying the HARQ information may be completely included in an OFDM symbol that is in time domain and that is of the time-frequency resource carrying the SR information. For another example, the time-frequency resource carrying the SR information and the time-frequency resource carrying the HARQ information may correspond to different quantities of OFDM symbols and different time lengths in time domain, and positions of start symbols of the SR information and the HARQ information may also be different.

Optionally, in some embodiments, the time-frequency resource carrying the HARQ information and the time-frequency resource carrying the SR information may be located in one slot in time domain. The slot may be configured by using the higher layer signaling or the downlink control information, and may be used to transmit uplink control information. The transmitted uplink control information is not specifically limited in this application. For example, the slot may be used to transmit the HARQ information, or may be used to transmit the SR information.

A type of the sent HARQ information is not specifically limited in this embodiment of this application. For example, the sent HARQ information may be a HARQ-acknowledgement (HARQ-acknowledgement, HARQ-ACK), or may be a HARQ-negative acknowledgment (HARQ-negative acknowledgment, HARQ-NACK).

In this embodiment of this application, there are a plurality of implementations of simultaneously sending the SR information and the HARQ information on a time-frequency resource. The implementations are not specifically limited in this application. For example, the SR information and the HARQ information may be sent by using the time-frequency resource corresponding to the HARQ information. For example, alternatively, the SR information may be sent by using a first time-frequency resource, and the HARQ information may be sent by using a second time-frequency resource. For another example, the HARQ information may be sent by using the time-frequency resource corresponding to the HARQ information, and the SR information is not sent. The following describes the three implementations in detail by using steps 130 to 150.

In step 130, the SR information and the HARQ information are sent by using the time-frequency resource corresponding to the HARQ information.

An implementation of sending the SR information and the HARQ information by using the time-frequency resource corresponding to the HARQ information is not specifically limited in this embodiment of this application. Multiplexing may be used for sending the SR information and the HARQ information. For example, the SR information and the HARQ information may be simultaneously sent, through joint coding, by using the time-frequency resource corresponding to the HARQ information.

An application scenario in which the SR information and the HARQ information are sent on the time-frequency resource corresponding to the HARQ information is not specifically limited in this embodiment of this application. The time-frequency resource carrying the SR information and the time-frequency resource carrying the HARQ information may partially overlap in time domain in any manner described above. Details are not described herein again.

In step 140, the SR information is sent by using the first time-frequency resource, and the HARQ information is sent by using the second time-frequency resource.

The first time-frequency resource and the second time-frequency resource are not specifically limited in this embodiment of this application. In an example, the first time-frequency resource may be represented as a part of the time-frequency resource corresponding to the SR information, this part of resource may not overlap the second time-frequency resource in time domain, and the second time-frequency resource may be represented as the time-frequency resource corresponding to the HARQ information. For example, when the time-frequency resource corresponding to the SR information and the time-frequency resource corresponding to the HARQ information partially overlap in time domain, the SR information may be sent by using a part of the time-frequency resource corresponding to the SR information, and the HARQ information may be sent by using the time-frequency resource corresponding to the HARQ information. A symbol corresponding to the part of the time-frequency resource corresponding to the SR information may be different, in time domain, from a symbol corresponding to the second time-frequency resource (namely, the time-frequency resource corresponding to the HARQ information). In an example, the first time-frequency resource may be represented as the time-frequency resource corresponding to the SR information, and the second time-frequency resource may be represented as a part of the time-frequency resource corresponding to the HARQ information, and does not overlap the first time-frequency resource in time domain. For example, when the time-frequency resource corresponding to the SR information and the time-frequency resource corresponding to the HARQ information partially overlap in time domain, the SR information may be sent on the time-frequency resource corresponding to the SR information, and the HARQ information may be sent by using a part of the time-frequency resource corresponding to the HARQ information. A symbol corresponding to the part of the time-frequency resource corresponding to the HARQ information may be different, in time domain, from a symbol corresponding to the first time-frequency resource (namely, the time-frequency resource corresponding to the SR information).

An application scenario in which the SR information is sent by using the first time-frequency resource and the HARQ information is sent by using the second time-frequency resource is not specifically limited in this embodiment of this application. The time-frequency resource carrying the SR information and the time-frequency resource carrying the HARQ information may overlap in time domain in any manner described above. Details are not described herein again.

In step 150, the HARQ information is sent by using the time-frequency resource corresponding to the HARQ information, and the SR information is not sent.

In this embodiment of this application, when the time-frequency resource corresponding to the HARQ information and the time-frequency resource corresponding to the SR information partially overlap in time domain, the SR information may not be sent, and the HARQ information is sent by using the time-frequency resource corresponding to the HARQ information.

An application scenario in which the HARQ information is sent by using the time-frequency resource corresponding to the HARQ information and the SR information is not sent is not specifically limited in this embodiment of this application. The time-frequency resource carrying the SR information and the time-frequency resource carrying the HARQ information may overlap in time domain in any manner described above. Details are not described herein again.

In this embodiment of this application, when the time-frequency resource carrying the HARQ information and the time-frequency resource carrying the SR information partially overlap in time domain, a latency requirement of the HARQ information (for example, a processing time of the terminal device or a transmission latency of the HARQ information) can be ensured, or a transmission time of the SR information can be ensured.

Optionally, in some embodiments, when the time-frequency resource corresponding to the SR information is earlier than, in time domain, the time-frequency resource corresponding to the HARQ information, the SR information is sent by using the first time-frequency resource, and the HARQ information is sent by using the second time-frequency resource.

In this embodiment of this application, a start position of the OFDM symbol corresponding to the time-frequency resource carrying the SR information may be earlier than, in time domain, a start position of the OFDM symbol corresponding to the time-frequency resource carrying the HARQ information. The SR information may be sent by using the first time-frequency resource, and the HARQ information may be sent by using the second time-frequency resource.

Optionally, in some embodiments, when the time-frequency resource corresponding to the SR information uses an uplink control channel format 0, the SR information may be sent by using the first time-frequency resource, and the HARQ information may be sent by using the second time-frequency resource. The first time-frequency resource may be a part of the time-frequency resource corresponding to the SR information, and may not overlap the second time-frequency resource in time domain. The second time-frequency resource may be the time-frequency resource corresponding to the HARQ information.

Optionally, in some embodiments, when the time-frequency resource corresponding to the HARQ information uses an uplink control channel format 0, the SR information may be sent by using the first time-frequency resource, and the HARQ information may be sent by using the second time-frequency resource. The first time-frequency resource may be the time-frequency resource corresponding to the SR information, and the second time-frequency resource may be a part of the time-frequency resource corresponding to the HARQ information, and may not overlap the first time-frequency resource in time domain.

In this embodiment of this application, the SR information may be sent by using a part (which does not overlap the HARQ resource in time domain) of the time-frequency resource corresponding to the SR information, or the HARQ information may be sent by using a part (which does not overlap the SR resource in time domain) of the time-frequency resource corresponding to the HARQ information, to ensure a processing latency of processing or generating the HARQ information by the terminal device and a transmission latency of the HARQ information.

Optionally, in some embodiments, when the time-frequency resource corresponding to the SR information is later than, in time domain, the time-frequency resource corresponding to the HARQ information, the SR information is sent by using the first time-frequency resource, and the HARQ information is sent by using the second time-frequency resource.

Optionally, in some embodiments, when the time-frequency resource corresponding to the SR information is later than, in time domain, the time-frequency resource corresponding to the HARQ information, the SR information and the HARQ information are sent by using the time-frequency resource corresponding to the HARQ information.

Optionally, in some embodiments, when the time-frequency resource corresponding to the SR information completely includes or is completely included in the time-frequency resource corresponding to the HARQ information in time domain, the SR information and the HARQ information are sent by using the time-frequency resource corresponding to the HARQ information.

Optionally, in some embodiments, when the time-frequency resource corresponding to the SR information is earlier or later than, in time domain, the time-frequency resource corresponding to the HARQ information, the HARQ information is sent by using the time-frequency resource corresponding to the HARQ information, and the SR information is not sent.

In this embodiment of this application, when the time-frequency resource carrying the HARQ information and the time-frequency resource carrying the SR information partially overlap in time domain (where the time-frequency resource corresponding to the SR information is earlier or later than, in time domain, the time-frequency resource corresponding to the HARQ information), if the SR information is not sent, behavior of the user equipment UE can be simplified and processing complexity can be reduced.

Optionally, in some embodiments, when the time-frequency resource corresponding to the SR information completely includes or is completely included, in time domain, in the time-frequency resource corresponding to the HARQ information, the HARQ information is sent by using the time-frequency resource corresponding to the HARQ information, and the SR information is not sent.

In this embodiment of this application, when the time-frequency resource carrying the HARQ information and the time-frequency resource carrying the SR information partially overlap in time domain (where the time-frequency resource for the HARQ information includes or is included in the time-frequency resource for the SR information), if the SR information is not sent, behavior of the user equipment UE can be simplified and processing complexity can be reduced.

Figure 2:
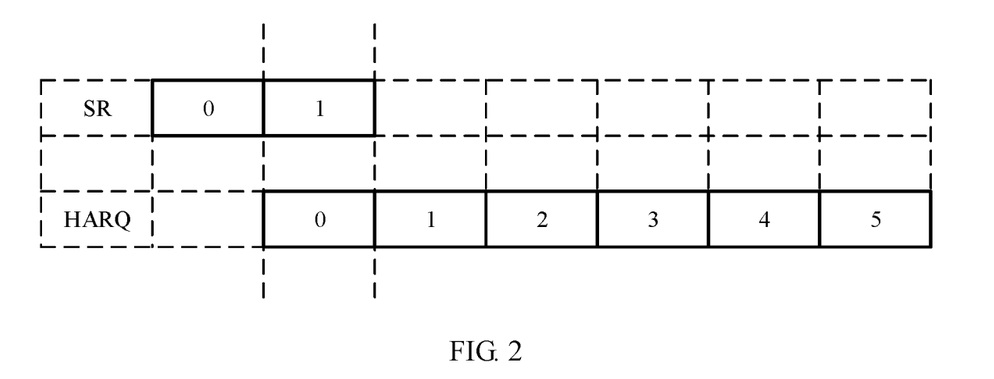
FIG. 2 is a schematic flowchart of a possible implementation according to another embodiment of this application.
Figure 3:
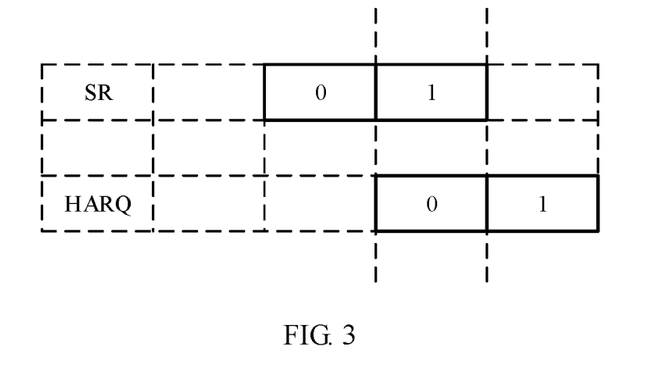
FIG. 3 is a schematic flowchart of a possible implementation according to another embodiment of this application.
Figure 4:
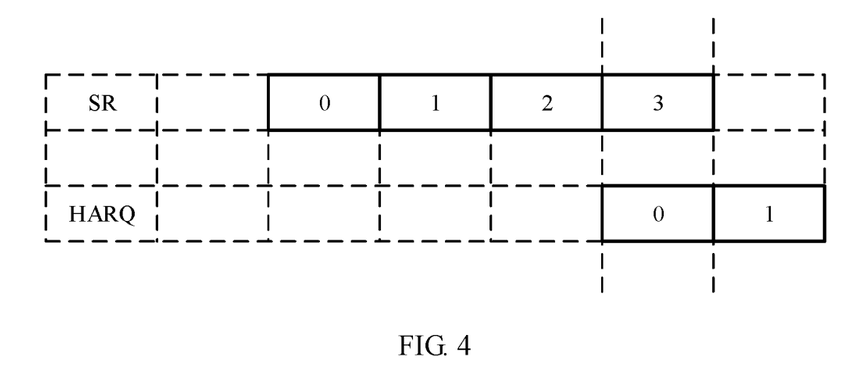
FIG. 4 is a schematic flowchart of a possible implementation according to another embodiment of this application.

The following may describe the embodiments of this application in more detail with reference to a specific embodiment when the time-frequency resource corresponding to the SR information is earlier than, in time domain, the time-frequency resource corresponding to the HARQ information. It should be noted that examples in FIG. 2 to FIG. 4 are merely intended to help a person skilled in the art understand the embodiments of this application, instead of limiting the embodiments of this application to specific values or specific scenarios shown in the examples. A person skilled in the art definitely can make various equivalent modifications or changes according to the examples shown in FIG. 2 to FIG. 4, and such modifications or changes also fall within the scope of the embodiments of this application.

Referring to FIG. 2, a time-frequency resource carrying SR information may occupy two OFDM symbols (a symbol 0 and a symbol 1) in time domain, a time-frequency resource carrying HARQ information may occupy six OFDM symbols (a symbol 0 to a symbol 5) in time domain, and the symbol 1 corresponding to the time-frequency resource carrying the SR information overlaps, in time domain, the symbol 0 corresponding to the time-frequency resource carrying the HARQ information.

A start position of the OFDM symbol corresponding to the time-frequency resource carrying the SR information is earlier than, in time domain, a start position of the OFDM symbol corresponding to the time-frequency resource carrying the HARQ information. In an example, the SR information may be sent by using the symbol 0 (the first time-frequency resource), and the HARQ information may be sent by using the symbols 0 to 5 (the second time-frequency resource). In another example, the SR information and the HARQ information may be sent on the OFDM (the symbol 0 to the symbol 5) corresponding to the time-frequency resource for the HARQ information.

Referring to FIG. 3, a time-frequency resource carrying SR information may occupy two OFDM symbols (a symbol 0 and a symbol 1) in time domain, a time-frequency resource carrying HARQ information may occupy two OFDM symbols (a symbol 0 and a symbol 1) in time domain, and the symbol 1 corresponding to the time-frequency resource carrying the SR information overlaps, in time domain, the symbol 0 corresponding to the time-frequency resource carrying the HARQ information.

A start position of the OFDM symbol corresponding to the time-frequency resource carrying the SR information is earlier than, in time domain, a start position of the OFDM symbol corresponding to the time-frequency resource carrying the HARQ information. In an example, the SR information may be sent by using the symbol 0 (the first time-frequency resource), and the HARQ information may be sent by using the symbols 0 and 1 (the second time-frequency resource). In another example, the SR information and the HARQ information may be sent on the OFDM (the symbol 0 and the symbol 1) corresponding to the time-frequency resource for the HARQ information.

Referring to FIG. 4, a time-frequency resource carrying SR information may occupy four OFDM symbols (a symbol 0 to a symbol 3) in time domain, a time-frequency resource carrying HARQ information may occupy two OFDM symbols (a symbol 0 and a symbol 1) in time domain, and the symbol 3 corresponding to the time-frequency resource carrying the SR information overlaps, in time domain, the symbol 0 corresponding to the time-frequency resource carrying the HARQ information.

A start position of the OFDM symbol corresponding to the time-frequency resource carrying the SR information is earlier than, in time domain, a start position of the OFDM symbol corresponding to the time-frequency resource carrying the HARQ information. In an example, the SR information may be sent by using the symbols 0 to 3 (the first time-frequency resource), and the HARQ information may be sent by using the symbol 1 (the second time-frequency resource). In another example, the HARQ information and the SR information may be sent by using the symbols 0 and 1 (the time-frequency resource corresponding to the HARQ information). In another example, the HARQ information may be sent on the OFDM (the symbol 0 and the symbol 1) corresponding to the time-frequency resource for the HARQ information. In this case, the SR information is not sent.

Optionally, in some embodiments, when the time-frequency resource corresponding to the SR information is later than, in time domain, the time-frequency resource corresponding to the HARQ information, the SR information and the HARQ information are sent by using the time-frequency resource corresponding to the HARQ information.

In this embodiment of this application, the start position of the OFDM symbol corresponding to the time-frequency resource carrying the SR information may be later than, in time domain, the start position of the OFDM symbol corresponding to the time-frequency resource carrying the HARQ information. In an example, the SR information may be sent by using the first time-frequency resource, and the HARQ information may be sent by using the second time-frequency resource. In another example, alternatively, the SR information and the HARQ information may be sent by using the time-frequency resource corresponding to the HARQ information.

Figure 5:
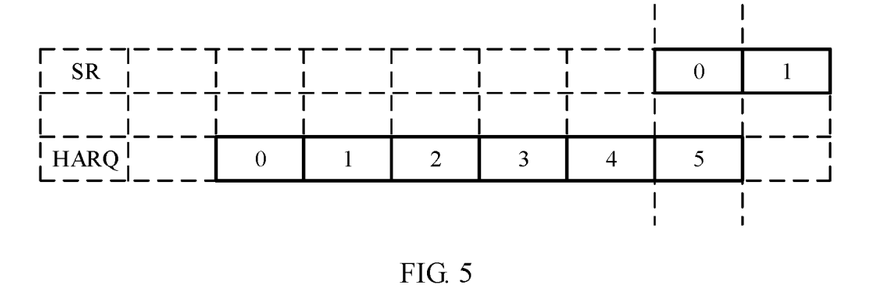
FIG. 5 is a schematic flowchart of a possible implementation according to another embodiment of this application.
Figure 6:
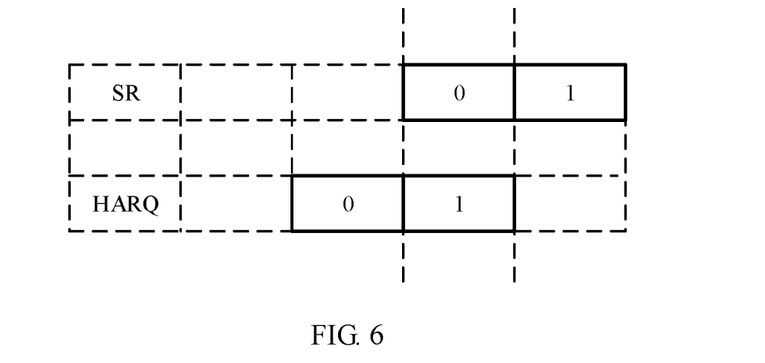
FIG. 6 is a schematic flowchart of a possible implementation according to another embodiment of this application.
Figure 7:
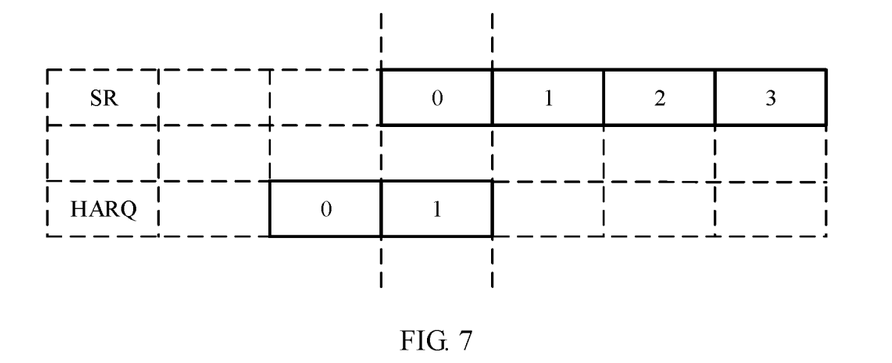
FIG. 7 is a schematic flowchart of a possible implementation according to another embodiment of this application.

The following may describe the embodiments of this application in more detail with reference to a specific embodiment when the time-frequency resource corresponding to the SR information is later than, in time domain, the time-frequency resource corresponding to the HARQ information. It should be noted that examples in FIG. 5 to FIG. 7 are merely intended to help a person skilled in the art understand the embodiments of this application, instead of limiting the embodiments of this application to specific values or specific scenarios shown in the examples. A person skilled in the art can definitely make various equivalent modifications or changes according to the examples shown in FIG. 5 to FIG. 7, and such modifications or changes also fall within the scope of the embodiments of this application.

Referring to FIG. 5, a time-frequency resource carrying SR information may occupy two OFDM symbols (a symbol 0 and a symbol 1) in time domain, a time-frequency resource carrying HARQ information may occupy six OFDM symbols (a symbol 0 to a symbol 5) in time domain, and the symbol 0 corresponding to the time-frequency resource carrying the SR information overlaps, in time domain, the symbol 5 corresponding to the time-frequency resource carrying the HARQ information.

A start position of the OFDM symbol corresponding to the time-frequency resource carrying the SR information is later than, in time domain, a start position of the OFDM symbol corresponding to the time-frequency resource carrying the HARQ information. In an example, the HARQ information and the SR information may be sent by using the symbols 0 to 5 (the time-frequency resource corresponding to the HARQ information). In another example, the SR information may be sent by using the symbol 1 (the first time-frequency resource), and the HARQ information may be sent by using the symbols 0 to 5 (the second time-frequency resource). In another example, the SR information and the HARQ information may be sent on the OFDM (the symbol 0 to the symbol 5) corresponding to the time-frequency resource for the HARQ information.

Referring to FIG. 6, a time-frequency resource carrying SR information may occupy two OFDM symbols (a symbol 0 and a symbol 1) in time domain, a time-frequency resource carrying HARQ information may occupy two OFDM symbols (a symbol 0 and a symbol 1) in time domain, and the symbol 0 corresponding to the time-frequency resource carrying the SR information overlaps, in time domain, the symbol 1 corresponding to the time-frequency resource carrying the HARQ information.

A start position of the OFDM symbol corresponding to the time-frequency resource carrying the SR information is later than, in time domain, a start position of the OFDM symbol corresponding to the time-frequency resource carrying the HARQ information. In an example, the SR information may be sent by using the symbols 0 and 1 (the first time-frequency resource), and the HARQ information may be sent by using the symbol 0 (the second time-frequency resource). In another example, the HARQ information and the SR information may be sent by using the symbols 0 and 1 (the time-frequency resource corresponding to the HARQ information). In another example, the HARQ information may be sent on the OFDM (the symbol 0 and the symbol 1) corresponding to the time-frequency resource for the HARQ information. In this case, the SR information is not sent.

Referring to FIG. 7, a time-frequency resource carrying SR information may occupy four OFDM symbols (a symbol 0 to a symbol 3) in time domain, a time-frequency resource carrying HARQ information may occupy two OFDM symbols (a symbol 0 and a symbol 1) in time domain, and the symbol 0 corresponding to the time-frequency resource carrying the SR information overlaps, in time domain, the symbol 1 corresponding to the time-frequency resource carrying the HARQ information.

A start position of the OFDM symbol corresponding to the time-frequency resource carrying the SR information is later than, in time domain, a start position of the OFDM symbol corresponding to the time-frequency resource carrying the HARQ information. In an example, the SR information may be sent by using the symbols 0 to 3 (the first time-frequency resource), and the HARQ information may be sent by using the symbol 0 (the second time-frequency resource). In another example, the HARQ information and the SR information may be sent by using the symbols 0 and 1 (the time-frequency resource corresponding to the HARQ information). In another example, the HARQ information may be sent on the OFDM (the symbol 0 and the symbol 1) corresponding to the time-frequency resource for the HARQ information. In this case, the SR information is not sent.

Optionally, in some embodiments, when the OFDM symbol corresponding to the time-frequency resource carrying the SR information may be completely included in the OFDM symbol corresponding to the time-frequency resource carrying the HARQ information, or the OFDM symbol corresponding to the time-frequency resource carrying the HARQ information may be completely included in the OFDM symbol corresponding to the time-frequency resource carrying the SR information, the SR information and the HARQ information may be sent by using the time-frequency resource corresponding to the HARQ information.

Figure 8:
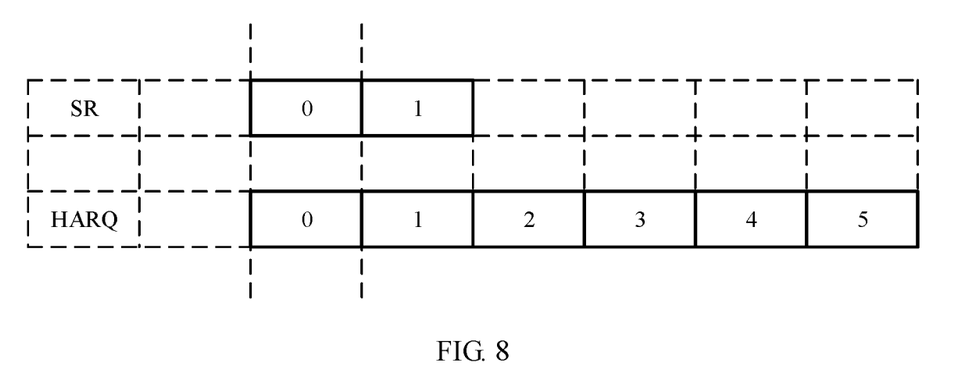
FIG. 8 is a schematic flowchart of a possible implementation according to another embodiment of this application.
Figure 9:
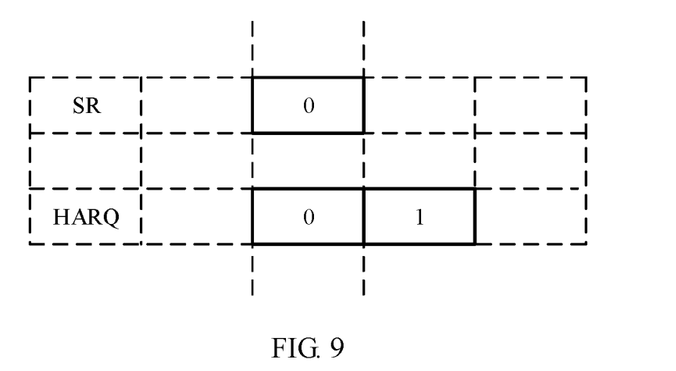
FIG. 9 is a schematic flowchart of a possible implementation according to another embodiment of this application.
Figure 10:
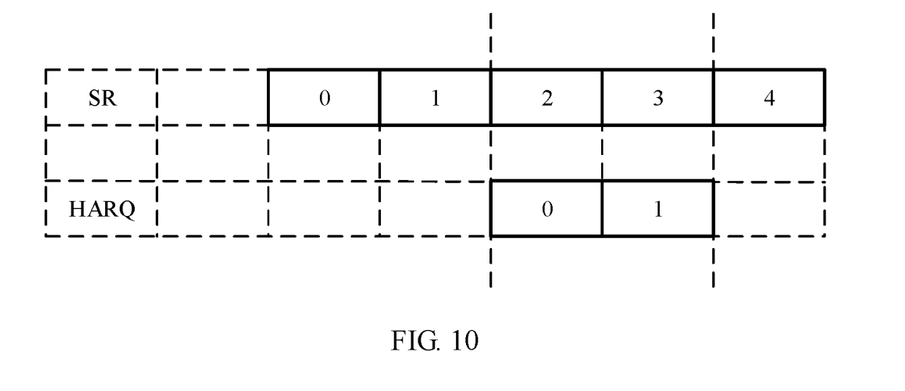
FIG. 10 is a schematic flowchart of a possible implementation according to another embodiment of this application.

The following may describe the embodiments of this application in more detail with reference to a specific embodiment when the time-frequency resource corresponding to the SR information is earlier than, in time domain, the time-frequency resource corresponding to the HARQ information. It should be noted that examples in FIG. 8 to FIG. 10 are merely intended to help a person skilled in the art understand the embodiments of this application, instead of limiting the embodiments of this application to specific values or specific scenarios shown in the examples. A person skilled in the art definitely can make various equivalent modifications or changes according to the examples shown in FIG. 8 to FIG. 10, and such modifications or changes also fall within the scope of the embodiments of this application.

Referring to FIG. 8, a time-frequency resource carrying SR information may occupy two OFDM symbols (a symbol 0 and a symbol 1) in time domain, and a time-frequency resource carrying HARQ information may occupy six OFDM symbols (a symbol 0 to a symbol 5) in time domain. The OFDM (the symbol 0 to the symbol 5) corresponding to the time-frequency resource carrying the HARQ information may completely include the OFDM (the symbol 0 and the symbol 1) corresponding to the time-frequency resource carrying the SR information. In an example, the HARQ information and the SR information may be sent by using the symbols 0 to 5 (the time-frequency resource corresponding to the HARQ information). In another example, the HARQ information may be sent on the OFDM (the symbol 0 to the symbol 5) corresponding to the time-frequency resource for the HARQ information. In this case, the SR information is not sent.

Referring to FIG. 9, a time-frequency resource carrying SR information may occupy one OFDM symbol (a symbol 0) in time domain, and a time-frequency resource carrying HARQ information may occupy two OFDM symbols (a symbol 0 and a symbol 1) in time domain. The OFDM (the symbol 0 and the symbol 1) corresponding to the time-frequency resource carrying the HARQ information may completely include the OFDM (the symbol 0) corresponding to the time-frequency resource carrying the SR information. In an example, the SR information may be sent by using the symbol 0 (the first time-frequency resource), and the HARQ information may be sent by using the symbol 1 (the second time-frequency resource). In another example, the HARQ information and the SR information may be sent by using the symbols 0 and 1 (the time-frequency resource corresponding to the HARQ information). In another example, the HARQ information may be sent on the OFDM (the symbol 0 and the symbol 1) corresponding to the time-frequency resource for the HARQ information. In this case, the SR information is not sent.

Referring to FIG. 10, a time-frequency resource carrying SR information may occupy five OFDM symbols (a symbol 0 to a symbol 4) in time domain, and a time-frequency resource carrying HARQ information may occupy two OFDM symbols (a symbol 0 and a symbol 1) in time domain. The OFDM (the symbol 0 and the symbol 1) corresponding to the time-frequency resource carrying the HARQ information may be completely included in the OFDM (the symbol 0 to the symbol 4) corresponding to the time-frequency resource carrying the SR information. In an example, the HARQ information and the SR information may be sent by using the symbols 0 and 1 (the time-frequency resource corresponding to the HARQ information). In another example, the HARQ information may be sent on the OFDM (the symbol 0 and the symbol 1) corresponding to the time-frequency resource for the HARQ information. In this case, the SR information is not sent.

The foregoing describes in detail the information transmission method provided in the embodiments of this application with reference to FIG. 1 to FIG. 10. The following describes in detail an information transmission apparatus provided in the embodiments of this application with reference to FIG. 11.

Figure 11:
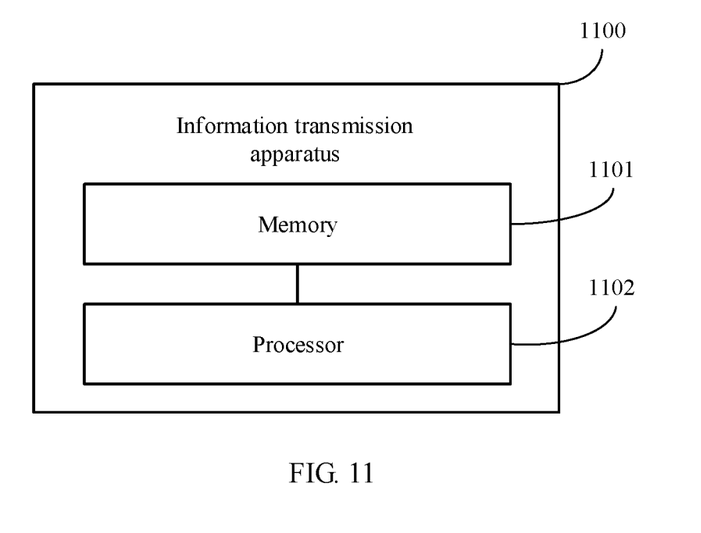
FIG. 11 is a schematic structural diagram of an information transmission apparatus according to an embodiment of this application.

FIG. 11 is a schematic structural diagram of an information transmission apparatus according to an embodiment of this application. The information transmission apparatus 1100 in FIG. 11 may perform the information transmission method described in any one of the embodiments in FIG. 1 to FIG. 10. The information transmission apparatus 1100 in FIG. 11 may include a memory 1101 and a processor 1102. The memory 1101 may be configured to store a program, and the processor 1102 may be configured to execute the program stored in the memory. When the program stored in the memory 1101 is executed, the processor 1102 may be configured to perform the information transmission method described in any one of the foregoing embodiments.

It should be understood that, the term "and/or" in the embodiments of this application describes only an association relationship for describing associated objects and represents that three relationships may exist. For example, A and/or B may represent the following cases: Only A exists, both A and B exist, and only B exists. In addition, the character "/" in this specification generally indicates an "or" relationship between the associated objects.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
   receiving, by a terminal device, higher layer signaling and downlink control information;
   respectively determining, by the terminal device based on the higher layer signaling and the downlink control information, a time-frequency resource corresponding to scheduling request (SR) information and a time-frequency resource corresponding to hybrid automatic repeat request (HARQ) information, wherein the time-frequency resource corresponding to the SR information and the time-frequency resource corresponding to the HARQ information partially overlap in time domain; and
   sending, by the terminal device, the SR information by using a first time-frequency resource, and sending, by the terminal device, the HARQ information by using a second time-frequency resource, wherein:
   the first time-frequency resource is a part of the time-frequency resource corresponding to the SR information and does not overlap the second time-frequency resource in time domain, wherein the second time-frequency resource is the time-frequency resource corresponding to the HARQ information; or
   the first time-frequency resource is the time-frequency resource corresponding to the SR information, wherein the second time-frequency resource is a part of the time-frequency resource corresponding to the HARQ information and does not overlap the first time-frequency resource in time domain.

2. The method according to claim 1, wherein the sending, by the terminal device, the SR information by using a first time-frequency resource, and sending, by the terminal device, the HARQ information by using a second time-frequency resource comprises:

when the time-frequency resource corresponding to the SR information is earlier than the time-frequency resource corresponding to the HARQ information in time domain,
sending, by the terminal device, the SR information by using the first time-frequency resource; and
sending, by the terminal device, the HARQ information by using the second time-frequency resource.

3. The method according to claim 1, wherein the sending, by the terminal device, the SR information by using a first time-frequency resource, and sending, by the terminal device, the HARQ information by using a second time-frequency resource comprises:

when the time-frequency resource corresponding to the SR information is later than the time-frequency resource corresponding to the HARQ information in time domain,
sending, by the terminal device, the SR information by using the first time-frequency resource; and
sending, by the terminal device, the HARQ information by using the second time-frequency resource.

4. An apparatus, comprising:
a non-transitory memory storage comprising instructions; and
one or more processors in communication with the memory storage, wherein the instructions, when executed by the one or more processors, cause the apparatus to:
receive higher layer signaling and downlink control information;
respectively determine, based on the higher layer signaling and the downlink control information, a time-frequency resource corresponding to scheduling request (SR) information and a time-frequency resource corresponding to hybrid automatic repeat request (HARQ) information, wherein the time-frequency resource corresponding to the SR information and the time-frequency resource corresponding to the HARQ information partially overlap in time domain; and
send the SR information by using a first time-frequency resource, and send the HARQ information by using a second time-frequency resource, wherein:
the first time-frequency resource is a part of the time-frequency resource corresponding to the SR information and does not overlap the second time-frequency resource in time domain, wherein the second time-frequency resource is the time-frequency resource corresponding to the HARQ information; or
the first time-frequency resource is the time-frequency resource corresponding to the SR information, wherein the second time-frequency resource is a part of the time-frequency resource corresponding to the HARQ information and does not overlap the first time-frequency resource in time domain.

5. The apparatus according to claim 4, wherein the instructions, when executed by the one or more processors, further cause the apparatus to:
when the time-frequency resource corresponding to the SR information is earlier than the time-frequency resource corresponding to the HARQ information in time domain,
send the SR information by using the first time-frequency resource; and
send the HARQ information by using the second time-frequency resource.

6. The apparatus according to claim 4, wherein the instructions, when executed by the one or more processors, further cause the apparatus to:
when the time-frequency resource corresponding to the SR information is later than the time-frequency resource corresponding to the HARQ information in time domain,
send the SR information by using the first time-frequency resource; and
send the HARQ information by using the second time-frequency resource.

7. An apparatus, comprising:
a non-transitory memory storage comprising instructions; and
one or more processors in communication with the memory storage, wherein the instructions, when executed by the one or more processors, cause the apparatus to:
send downlink control information or higher layer signaling;
configure a time-frequency resource corresponding to scheduling request (SR) information and a time-frequency resource corresponding to hybrid automatic repeat request (HARQ) information, wherein the time-frequency resource corresponding to the SR information and the time-frequency resource corresponding to the HARQ information partially overlap in time domain; and
receive the SR information by using a first time-frequency resource, and receive the HARQ information by using a second time-frequency resource, wherein:
the first time-frequency resource is a part of the time-frequency resource corresponding to the SR information and does not overlap the second time-frequency resource in time domain, wherein the second time-frequency resource is the time-frequency resource corresponding to the HARQ information; or
the first time-frequency resource is the time-frequency resource corresponding to the SR information, wherein the second time-frequency resource is a part of the time-frequency resource corresponding to the HARQ information and does not overlap the first time-frequency resource in time domain.

8. The apparatus according to claim 7, wherein the instructions, when executed by the one or more processors, further cause the apparatus to:
when the time-frequency resource corresponding to the SR information is earlier than the time-frequency resource corresponding to the HARQ information in time domain,
receive the SR information by using the first time-frequency resource; and
receive the HARQ information by using the second time-frequency resource.

9. The apparatus according to claim 7, wherein the instructions, when executed by the one or more processors, further cause the apparatus to:

when the time-frequency resource corresponding to the SR information is later than the time-frequency resource corresponding to the HARQ information in time domain,
receive the SR information by using the first time-frequency resource; and
receive the HARQ information by using the second time-frequency resource.

* * * * *

UNITED STATES PATENT AND TRADEMARK OFFICE
CERTIFICATE OF CORRECTION

PATENT NO. : 11,438,105 B2
APPLICATION NO. : 16/925506
DATED : September 6, 2022
INVENTOR(S) : Fan Yang et al.

It is certified that error appears in the above-identified patent and that said Letters Patent is hereby corrected as shown below:

On the Title Page

Item [57], Line 8, delete "information;" and insert -- information. --.

Signed and Sealed this
Twenty-fifth Day of April, 2023

Katherine Kelly Vidal
*Director of the United States Patent and Trademark Office*